(12) United States Patent
Branton

(10) Patent No.: US 11,870,654 B2
(45) Date of Patent: Jan. 9, 2024

(54) METHODS AND SYSTEMS FOR INTRODUCING SELF-CONTAINED INTENT FUNCTIONALITY INTO DECENTRALIZED COMPUTER NETWORKS

(71) Applicant: Matthew Branton, New York, NY (US)

(72) Inventor: Matthew Branton, New York, NY (US)

(*) Notice: Subject to any disclaimer, the term of this patent is extended or adjusted under 35 U.S.C. 154(b) by 377 days.

(21) Appl. No.: 17/208,925

(22) Filed: Mar. 22, 2021

(65) Prior Publication Data

US 2022/0052921 A1 Feb. 17, 2022

Related U.S. Application Data

(63) Continuation-in-part of application No. 16/993,137, filed on Aug. 13, 2020, now Pat. No. 10,972,349.

(51) Int. Cl.

| | |
|---|---|
| *H04L 29/06* | (2006.01) |
| *H04L 41/12* | (2022.01) |
| *G06F 16/25* | (2019.01) |
| *H04L 9/32* | (2006.01) |
| *H04L 47/70* | (2022.01) |
| *H04L 9/40* | (2022.01) |
| *H04L 9/00* | (2022.01) |

(52) U.S. Cl.
CPC ............ *H04L 41/12* (2013.01); *G06F 16/258* (2019.01); *H04L 9/3236* (2013.01); *H04L 9/3247* (2013.01); *H04L 47/82* (2013.01); *H04L 63/123* (2013.01); *H04L 9/50* (2022.05); *H04L 2209/56* (2013.01)

(58) Field of Classification Search
CPC ..... H04L 41/12; H04L 9/3236; H04L 9/3247; H04L 47/82; H04L 63/123
USPC ......................................................... 713/170
See application file for complete search history.

(56) References Cited

U.S. PATENT DOCUMENTS

| | | | | |
|---|---|---|---|---|
| 11,269,859 | B1* | 3/2022 | Luedtke | G06F 16/245 |
| 2020/0026785 | A1* | 1/2020 | Patangia | H04L 9/0643 |
| 2021/0256587 | A1* | 8/2021 | de Vos | G06F 21/64 |
| 2022/0086201 | A1* | 3/2022 | Davis | H04L 65/60 |

* cited by examiner

*Primary Examiner* — Evans Desrosiers
(74) *Attorney, Agent, or Firm* — Perkins Coie LLP

(57) ABSTRACT

Methods and systems for introducing self-contained intent functionality into decentralized computer networks is described. Specifically, the methods and systems for encoding user intent (e.g., what functions a value may be used for) into data structures for computer programs and/or transaction protocols intended to automatically execute, control, or record events and actions according to predetermined terms or criteria are described herein. For example, the methods and systems may include using a permission structure native to one or more cryptocurrencies to provide additional functionality that allows for an intent to be introduced into the computer program and/or transaction protocol. This intent may be introduced using a routing data structure indicating exchange eligibility of resource sources.

20 Claims, 7 Drawing Sheets

Blockchain 200

⋮

Block 202

[Transaction information 222a and/or cryptographic version thereof]
[Transaction information 222b and/or cryptographic version thereof]
...
[Transaction information 222n and/or cryptographic version thereof]

⋮

Block 204

[Transaction information 224a and/or cryptographic version thereof]
[Transaction information 224b and/or cryptographic version thereof]
...
[Transaction information 224n and/or cryptographic version thereof]

⋮

Block 206

[Transaction information 226a and/or cryptographic version thereof]
[Transaction information 226b and/or cryptographic version thereof]
...
[Transaction information 226n and/or cryptographic version thereof]

```
1  pragma solidity ^0.6.0;
2
3  interface IERC20 {
4
5      function totalSupply() external view returns (uint256);
6      function balanceOf(address account) external view returns (uint256);
7      function allowance(address owner, address spender) external view returns (uint256);
8
9      function transfer(address recipient, uint256 amount) external returns (bool);
10     function approve(address spender, uint256 amount) external returns (bool);
11     function transferFrom(address sender, address recipient, uint256 amount) external
12
13
14     event Transfer(address indexed from, address indexed to, uint256 value);
15     event Approval(address indexed owner, address indexed spender, uint256 value);
16  }
17
```

METHODS AND SYSTEMS FOR INTRODUCING SELF-CONTAINED INTENT FUNCTIONALITY INTO DECENTRALIZED COMPUTER NETWORKS

CROSS-REFERENCE TO RELATED APPLICATIONS

This application is a continuation-in-part of U.S. patent application Ser. No. 16/993,137, filed Aug. 13, 2020. The content of the foregoing application is incorporated herein in its entirety by reference.

FIELD

The present application generally relates to cryptographic data verification, such as, for example, cryptographic verification of one or more data inputs for an executable capable of initiating an update to a decentralized network, introduction of self-contained intent functionality into decentralized computer networks, etc.

BACKGROUND

Computer programs include code that, when executed, cause a computing device to perform one or more actions. The computer programs may start manually or automatically. An example of starting a computer program manually may be invoking a command (e.g., by pressing a button, clicking a mouse, tapping a touch screen, etc.). Automatically executed computer programs require certain conditions to be met. For example, a computer program may be automatically invoked when a sensor detects a particular input signal (e.g., a light is turned on when a motion sensor detects movement). However, for many computer programs, verifying the authenticity of the inputs that cause the condition to be met can be difficult. Verification of input parameters may compound in difficulty if a source of the inputs is unable to be verified as having generated the inputs. This problem is particularly apparent in the realm of smart contracts, in which a computer program or a transaction protocol is intended to automatically execute, control, or record events and actions according to predetermined terms or criteria. In such cases, the predetermined terms or criteria may be directly recorded in lines of software code. The computer program, and its code, may then be distributed across a decentralized blockchain network without modification to the predetermined terms or criteria.

SUMMARY

Computer programs or protocols as described above can provide significant benefits, namely the speed, efficiency and overall lack of required oversight. However, the speed, efficiency and overall lack of required oversight also has its drawbacks. Specifically, lines of software code originally drafted may allow for different interpretations (e.g., by different receiving systems, programs, etc.) that may or may not have been originally intended. This lack of nuance regarding the original intent may result in the computer programs or protocols rapidly straying from their initial purpose, particularly as the programs are introduced to a decentralized network. This problem is only compounded by the speed, efficiency, and overall lack of required oversight of these computer programs and protocols as changes in the original intent may already be acted upon in irreversible ways far before the problem is detected.

Conventional systems have no mechanism for dealing with these issues, particularly in view of the need to maintain a system that provides the speed, efficiency and overall lack of required oversight. However, as described herein, methods and systems for overcoming the aforementioned issues without diminishing the aforementioned benefits is provided. Moreover, the methods and systems solve these problems through a novel data structure and architecture that is compatible with existing computer programs and/or transaction protocols that are intended to automatically execute, control, or record events and actions according to predetermined terms or criteria. That is, the methods and systems for overcoming the aforementioned issues without diminishing the aforementioned benefits is provided by introducing self-contained intent functionality into decentralized computer networks.

Specifically, the methods and systems for encoding user intent (e.g., what functions a value may be used for) into data structures for computer programs and/or transaction protocols intended to automatically execute, control, or record events and actions according to predetermined terms or criteria are described herein. For example, the methods and systems may include using a permission structure native to one or more cryptocurrencies (e.g., Bitcoin, Ethereum, etc.). The system may harness the unique data structures (e.g., a blockchain) to provide additional functionality that allows for an intent to be introduced into the computer program and/or transaction protocol. As one example, the system may create a plurality of smart contracts with a liquidity source mapping using approval events within the blockchain. For example, in conventional systems, specific purposes (e.g., liquidity testing on smart contract) may be assessed by locking tokens (e.g., indicating in a blockchain ledger that specific tokens are used for a specific purpose) to that specific purpose, not by using permissions associated with a function in the blockchain. The methods and systems may utilize this permission structure to encode functionality associated with a user intent (e.g., such as a liquidity source mapping). Accordingly, each smart contract may individually signal available liquidity which may then be accessed in a controlled way from the single smart contract.

This intent may be introduced using a routing data structure indicating exchange eligibility of resource sources. For example, the system may receive a resource exchange request for exchanging a first resource of a first decentralized network for a second resource of a second decentralized network. In response to receiving this exchange request, the system may verify acceptance of the resource exchange request based on a routing data structure. Additionally or alternatively, the system may generate this routing data structure based on extracting information from the computer programs and/or transaction protocols itself. As the routing data structure is extracted from the computer programs and/or transaction protocols themselves, the computer programs and/or transaction protocols remain capable of automatically executing, controlling, and/or recording events and actions according to predetermined terms or criteria, but now with the added functionality that introduces an original intent. That is, the systems and methods implement the functional intent without sacrificing the speed, efficiency and overall lack of required oversight.

For example, if the user intent is to provide a smart contract that will swap liquidity based on the rules of the contract, the system may index approval events and generate a routing data structure based on this index. Once the routing data structure has been created, it may be queried by the contract to receive an address that may act as a counter party in any given transaction; thus indicating a liquidity source mapping. Using this arrangement, a user account may delegate to any number of contracts (e.g., based on the exchange of ERC20 tokens), thereby implicitly creating a liquidity source mapping through the indexed approval events. For example, each contract may index all approval events in a single contract, which creates a liquidity routing table based on token type and quantity, and which may be used later by each contract to initiate a swap.

In some aspects, the methods and systems described herein for introducing self-contained intent functionality into decentralized computer networks. For example, the system may obtain an executable address associated with an executable on a decentralized network. The system may then perform, based on the executable address, a query for token allowance events associated with the executable, the token allowance events being stored in cryptographically-linked data structures of the decentralized network. The system may then extract, from the token allowance events, source addresses associated with network tokens of the decentralized network and allowance amounts associated with the network tokens, wherein each of the network tokens corresponds to a resource related to the decentralized network. The system may then generate, based on the extractions, a routing data structure indicating exchange eligibility of resource sources. The system may then obtain a resource exchange request for exchanging one or more resources of the first decentralized network. The system may then verify acceptance of the resource exchange request based on the routing data structure in response to obtaining the resource exchange request. The system may then initiate a first update to the first decentralized network and a second update to the second centralized network in response to verifying the acceptance of the resource exchange request based on the routing data structure.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 2 shows a blockchain including blocks and transactions, in accordance with one or more embodiments.

FIG. 5 show illustrative interfaces for an ERC-20 smart contract, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
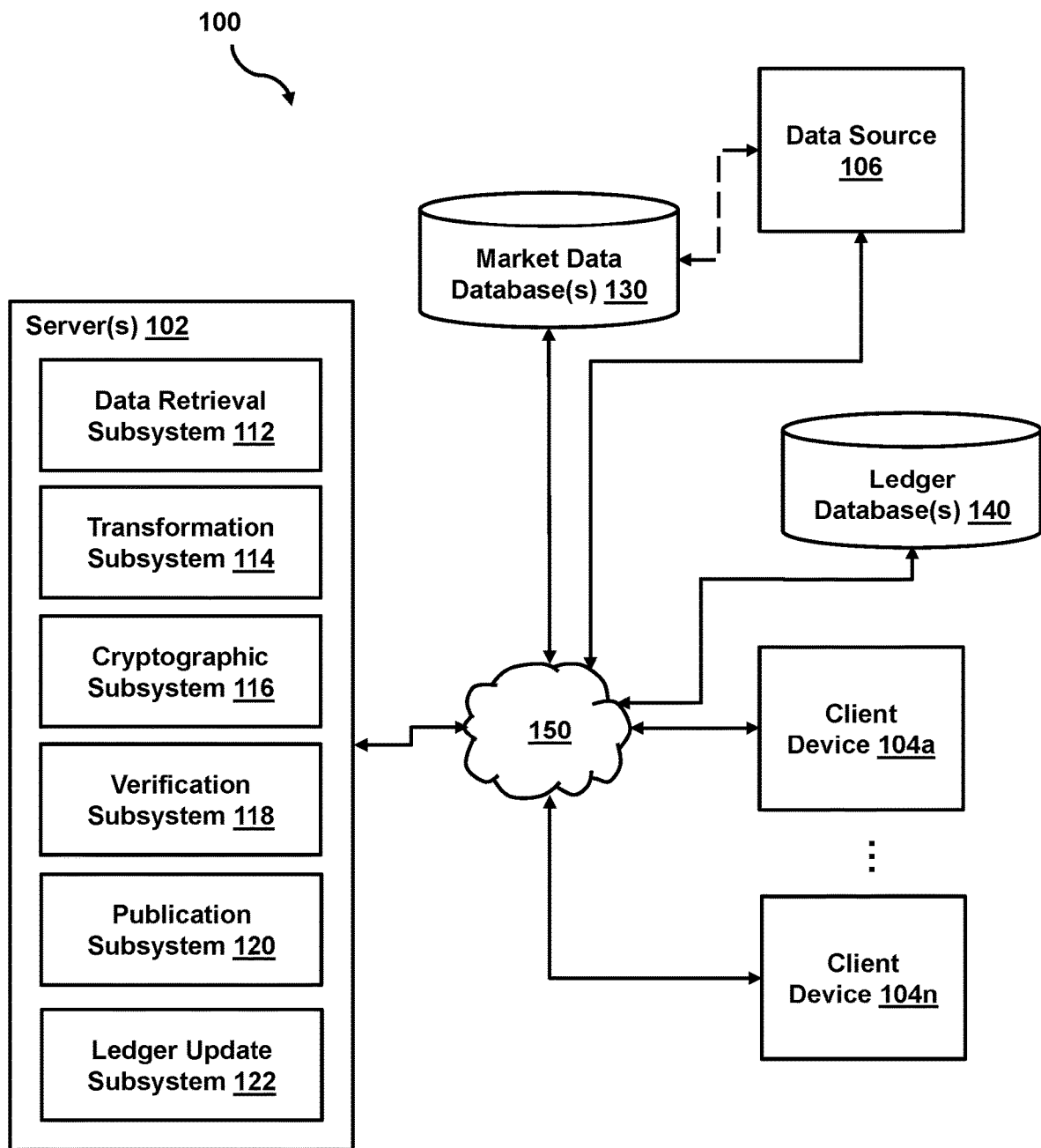
FIG. 1 shows a system for facilitating cryptographic verification of update data, in accordance with one or more embodiments.

FIG. 1 shows a system for facilitating cryptographic verification of update data, in accordance with one or more embodiments. As shown in FIG. 1, system 100 may include server(s) 102, data source 106, client devices 104*a*-104*n* (individually and collectively referred to as "client device 104" and "client devices 104," respectively), or other components. Server 102 may include a data retrieval subsystem 112, a transformation subsystem 114, a cryptographic subsystem 116, a verification subsystem 118, a publication subsystem 120, a ledger update subsystem 122 or other components. Data source 106 may include a source of update data, such as a market update, a status update, a file update, or other data. As an example, data source 106 may be an exchange that generates update data. Each client device 104 may include any type of mobile terminal, fixed terminal or other device. By way of example, client device 104 may include a desktop computer, a notebook computer, a tablet computer, a smartphone, a wearable device or other client device. Users may, for instance, utilize one or more client devices 104 to interact with one another, one or more servers, or other components of system 100. It should be noted that, while one or more operations are described herein as being performed by particular components of server 102, client devices 104, and/or data source 106, those operations may, in some embodiments, be performed by other components of server 102, client devices 104, and/or data source 106 or other components of system 100. As an example, while one or more operations are described herein as being performed by components of server 102, those operations may, in some embodiments, be performed by components of client device 104. In one use case, for instance, server 102, client device 104, or data source 106 may each be a network node that comprises subsystems 112-122 or other components. Furthermore, client device 104, data source 106, or client device 104 and data source 106 may each include an instance of subsystems 112-122. For example, data source 106 may include an instance of data retrieval subsystem 112, an instance of transformation subsystem 114, an instance of cryptographic subsystem 116, an instance of verification subsystem 118, an instance of publication subsystem 120, an instance of ledger update subsystem 122 or other components. It should be noted that, although some embodiments herein describe features with respect to Bitcoin or Ethereum, such features may in other embodiments be apply to other digital currencies as well as other blockchain or other ledger technologies.

A smart contract refers to a computer program that is configured to automatically execute upon determining that criteria of the contract have been met. As an example, consider a binary option on the price of a company's stock that expires at the end of a particular day. A smart contract may be created that allows parties to deposit a certain quantity of funds (e.g., dollars, Euros, Bitcoin, etc.) and choose whether the price of the stock will be greater than or less than a strike price. If a party bids correctly on the option, then the smart contract may automatically disperse funds to that part. However, in order for the smart contract to execute, the actual price of the company's stock must be known.

In some embodiments, a smart contract may be based on tokens. Tokens may virtually represent anything from reputation points in an online platform, skills of a character in a game, and lottery tickets to a financial asset bond to a real good like a share in a company, a fiat currency, a gold ounce, etc. In addition, tokens may include non-fungible tokens, cryptocurrencies, utility tokens, or other types of tokens. Furthermore, each token may be based on a given standard. In some embodiments, the standard may be based on ERC-20, which are designed for the Ethereum platform.

Currently, there are no mechanisms available for mathematically verifying that a proposed update has available liquidity. For example, given a market update from an exchange, which may be received by a first party and provided to a second party, there are no mechanisms currently available for the first or second party to mathematically signal that there is available liquidity for the proposed exchanged. Moreover, in order for this mechanism to be effective, the mechanism may require being accessed in a controlled way from a single smart contract.

In some embodiments, system 100 may facilitate verification of update data, which may be used by an executable to initiate an update on a decentralized and distributed digital ledger (e.g., a decentralized blockchain or other decentralized ledger). The decentralized and distributed digital ledger may be used to record transactions across many computer systems associated with different entities in such a way that the transactions cannot be altered retroactively without the alteration of all subsequent blocks and the collusion of the network. The use of a blockchain (or other such ledger) removes the characteristic of infinite reproducibility from a digital asset, and confirms that each asset or each unit of value was transferred only once, thereby solving the long-standing problem of double spending. As an example of a digital ledger, FIG. 2 shows a blockchain (e.g., blockchain 200) including blocks (e.g., blocks 202, 204, and 206) and transactions (e.g., transaction information 222, transaction information 224, transaction information 226 or cryptographic versions thereof). Each block may hold batches of valid transactions that are hashed and encoded (e.g., into a Merkle tree or other tree). Each block may also include the hash of the immediately-prior block of the blockchain, thereby linking the two blocks. The iterative process to form the chain of blocks confirms the integrity of the previous block, all the way back to the original genesis block. By storing data across its network, the decentralized blockchain eliminates the risks that come with data being held centrally. Specifically, for example, the decentralized blockchain lacks centralized points of vulnerability that can be exploited, as well as a central point of failure that can bring down the entire network. In some embodiments, digital ledger security may include the use of public-key cryptography. In some embodiments, a public key associated with a user may be used as an address on a blockchain or other ledger. One or more tokens (e.g., non-fungible tokens, cryptocurrencies, utility tokens, etc.) that are sent across the ledger network may be recorded as belonging to that address (e.g., previously belonging to that address prior to a valid transaction conveying the tokens to another user, currently belonging to that address as a result of a transaction conveying the tokens to the user, etc.). A private key (corresponding to the public key) may be used by the user to access to the user's digital assets or otherwise interact with the blockchain (or other ledger).

The private key and the public key form the basis for asymmetric cryptography. Each public key is associated with one private key, and together the public key and the private key may be used to encrypt and decrypt communications. For example, a communication that is encoded using a given user's public key can only be decoded using that user's private key, thereby enabling secure transmission of the communication to the user. As another example, a communication that is encoded using a given user's private key may be decoded by using the user's public key. The private key and the public key are mathematically related to one another. Various mathematical algorithms can be used to produce a public key and a private key for a user including, but not limited to (not to imply that other lists are limiting), Rivest-Shamir-Adleman (RSA), Digital Signature Standard (DSS), Diffie-Hellman key exchange protocol, ElGamal, elliptic curve cryptography (e.g., Curve-25519, NIST P-256), Paillier cryptosystems, Cramer-Shoup cryptosystems, YAK, Merkle-Hellman knapsack cryptosystems, or other algorithms.

In some embodiments, system 100 maintains data quality via massive database replication and computational trust across its network nodes, where no centralized "official" copy of the blockchain (or other such digital ledger described herein) exists, and no user is "trusted" more than any other user. In some embodiments, messages reporting transactions are delivered to network nodes on a best effort basis. Upon obtaining such messages, mining nodes validate the transactions, add them to the block that the mining nodes are building, and broadcast the completed block to other nodes. In some embodiments, various time-stamping schemes may be used to serialize changes on the blockchain (or other ledger). The time-stamping schemes may include proof-of-work, proof-of-stake, proof-of-burn or other schemes.

Blockchain 200, or another digital ledger, may be updated in response to an executable initiating the update. In some embodiments, a smart contract or other executable may initiate an update to a blockchain in response to certain conditions being satisfied. As an example, the condition being satisfied may include a verification, may be performed with respect to parameter values of update data and a reference value, where the reference value may be generated from a digital signature related to the update data and a public key associated with a data source from which the update data was obtained (e.g., data source 106). In some embodiments, the verification may be performed to signal available liquidity which can be accessed in a controlled way from a single smart contract. In some embodiments, the executable (e.g., a smart contract) may be stored on a decentralized network, and the blockchain may also be on the decentralized network.

For example, the smart contract may include a unique data structures to provide additional functionality that allows for an intent to be introduced into the computer program and/or transaction protocol. The intent may be preserved in the executable in the decentralized network through the use of a routing data structure indicating exchange eligibility of resource sources. For example, the system may receive a resource exchange request for exchanging a first resource of a first decentralized network for a second resource of a second decentralized network. In response to receiving this exchange request, the system may verify acceptance of the resource exchange request based on a routing data structure. Additionally or alternatively, the system may generate this routing data structure based on extracting information from the computer programs and/or transaction protocols itself. As the routing data structure is extracted from the executable, the executable remains capable of automatically executing, controlling, and/or recording events and actions according to predetermined terms or criteria, but now with the added functionality that introduces an original intent.

Data source 106 may refer to an entity that generate update data and/or a message including/representing update data. For example, market data may be published by an exchange or via another channel that obtains the market data from the exchange (or from another channel). If a party receives the market data directly from the exchange, and has an established trust with the exchange, then the party can trust that the market data is accurate. However, most parties do not receive market data directly from an exchange, or are able to establish a level of trust with the exchange to confirm the authenticity of the market data. For example, given a market update from a data source (e.g., an exchange), received by a first party, which, in turn, provides the market update to a second party, there are no present mechanism available for the first or second party to mathematically verify that the market update originated from the data source. For this reason, executing settlements via a smart contract using such market data will rely implicitly on unverified data (such data may include available liquidity).

In one use case, financial contracts, which may be smart contracts (e.g., digital contracts), require settlement information at a minimum in order to execute the terms of the contracts. The settlement information may be obtained from financial exchanges (e.g., data sources). Trading-related applications typically require market data from one or more data sources. One type of data source is an "oracle." An oracle refers to a data source that is trusted to provide accurate information (e.g., market data). In some embodiments, blockchains and other digital ledgers running on a distributed and decentralized network may be provided with market information from an oracle due to the level of trust associated with the oracle. However, the most accurate market data is received from an exchange directly because that is the data source that generates the market data. Providing this trusted market data to applications that would otherwise use an oracle, such as smart contracts executing financial decisions, it enables a simple and effective mechanism to create trustless instruments.

In some embodiments, update data includes market data (e.g., financial market data). Market data may include a number of parameters. For example, the market data may include a primary instrument, a secondary instrument, a price, a quantity, a side, a timestamp or sequence number or other parameters. A primary instrument refers to an instrument having characteristics that are not calibrated against any other instrument. A secondary instrument refers to an instrument that have characteristics that are calibrated or determined from other instruments. As an example, a primary instrument may refer to a symbol representing an asset (e.g., stock, bond, non-fungible token or other digital asset, or other asset), and the secondary instrument may refer to a price of that asset in a particular currency or in relation to another currency. The price may refer to a value of the primary instrument in terms of the secondary instrument (e.g., the price of Company X's stock in dollars, the price of a non-fungible token in Bitcoin, etc.). The quantity may refer to a number of units of the primary instrument, which may be whole units, fractions of a unit or both. The timestamp or sequence number may refer to a point in time that the market data occurred with reference to a time (e.g., a particular clock), relative to other updates in a given session of updates, etc. In some embodiments, additional information, such as decimalization, minimum or maximum quantities, internal identifier to symbol mappings, or other information, may also be included or associated with the update data. In some embodiments, the information regarding the data source itself may be included with the update data, associated with the update data or derivable from the update data. For example, the update data may include an IP address, URL, MAC address, public key, or other identification information associated with data source 106.

In some embodiments, data retrieval subsystem 112 may obtain a message which may include first data. For example, data retrieval subsystem 112 may obtain market data related to an update to a financial market, such as a new or updated value of a stock or other instrument at a given time. The message may be obtained from a data source (e.g., data source 106). An example of a data source may be a financial exchange, a party that obtained the message from a data source and subsequently provided the message to server 102 or another entity. The number of parties that relay the message prior to being sent to server 102 may be 1 or more parties, 5 or more parties, 10 or more parties, etc. As a recipient of the message, server 102 relies on a web of trust of the parties for validity of the message and its contents unless server 102 can be guarantee that the source from which the message was received is the generator of the market data.

In some embodiments, the message may include a source identifier associated with data source 106 and values associated with one or more parameters for an executable. The source identifier may represent an identifier of the data source, such as a web address of the data source (e.g., an IP address, MAC address, etc.), a symbolic representation of the data source (e.g., one or more characters representing the source) or other identifiers. The source identifier may be a publicly available representation or may be a privately-used representation, known only to certain authorized entities. The values of the parameters for the executable may represent values capable of being input to the executable for initiating an update to the network. For example, the values may be inputs for a smart contract that can initiate an update to a blockchain. If the values, after being provided to the smart contract, indicate that a new block is to be added to the blockchain, then the smart contract may use the values and aspects of the smart contract to cause a block associated with the update to be added to the blockchain. For example, if the smart contract indicates that a certain amount of funds are to be dispersed to a party based on the smart contract and the values (e.g., Party A is to receive X funds from Party B based on the value of stock Y at time Z), then a block may be added to a blockchain on a decentralized network representing the transaction.

Figure 3A:
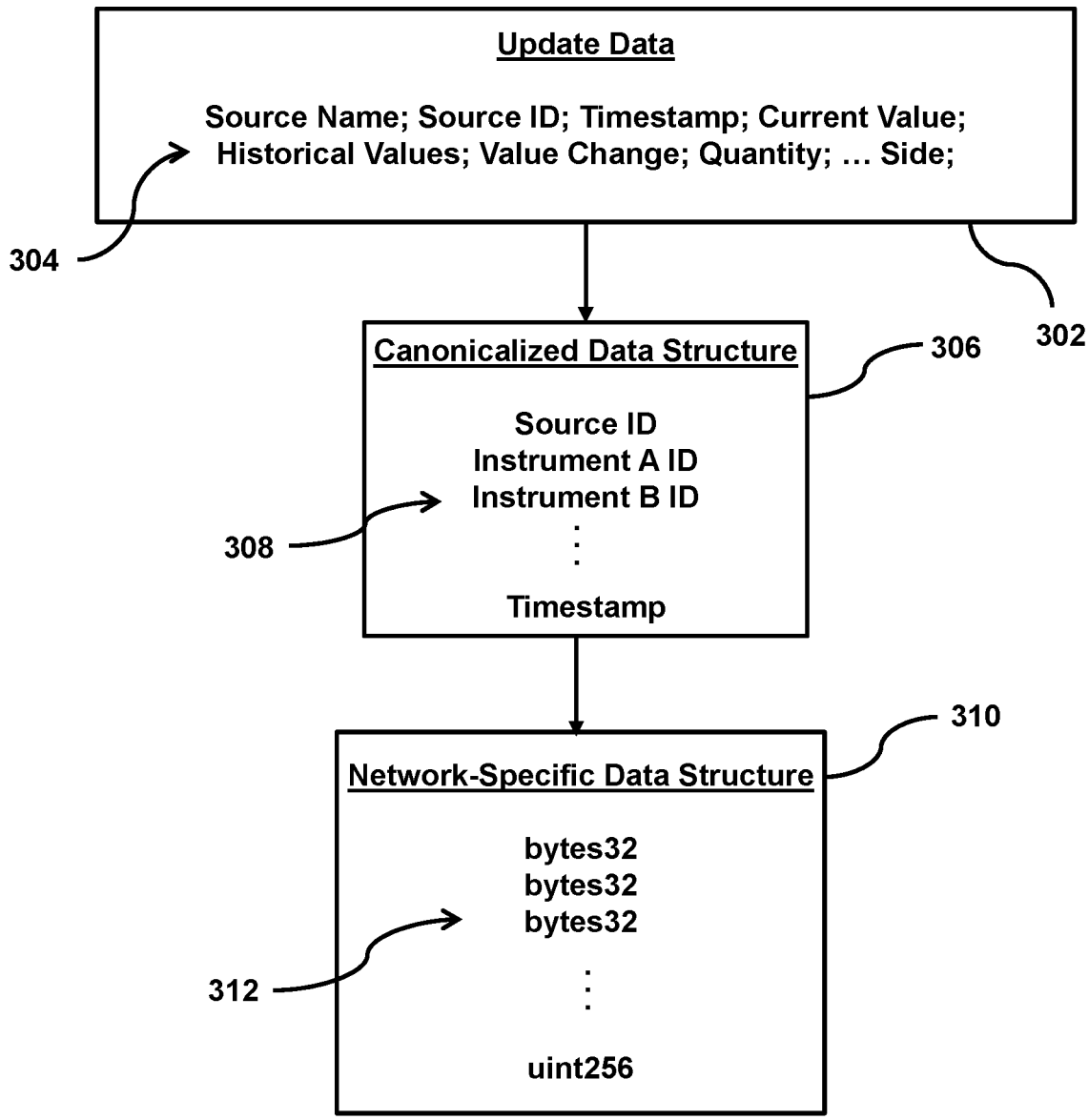
FIGS. 3A and 3B show update data being transformed into a network-specific data structure, and using the network-specific data structure and a public key to perform a verification of the update data, respectively, in accordance with one or more embodiments.

In some embodiments, the message, the updated data included within the message, or both, may be represented in a first format. For example, the update data may include a string of characters (e.g., letters, numbers, punctuations, etc.) including information regarding a primary instrument, a secondary instrument, a price, a quantity, a side, a timestamp or sequence number, or other information. As an example, with reference to FIG. 3A, update data 302 may include parameter values 304 (e.g., Source Name, Source ID, Timestamp, Current Value, Historical Values, Value Change, Quantity, Side or other parameters values) represented in a first format. In some embodiments, the first format may include representing parameter values 304 as a continuous string of characters with delimiters or other demarcations indicating when one parameter value ends and another begins. In some embodiments, one of parameter values 304 may be used to provide an intent to a smart contract.

In some embodiments, transformation subsystem 114 may be configured to take the obtained message, the update data included within the obtained message, or both, and transform the message from the first format into a first data structure. For example, with reference to FIG. 3A, update data 302 may be transformed into canonicalized data structure 306 including parameter values 308. The first data structure may be a canonicalized data structure having a canonicalized format that differs from the first format (e.g., the format of the update data originally obtained). Additionally, the canonicalized data structure may represent the values for the executable, included by the update data, in the canonicalized format. The canonicalized format may be a standardized format, which as detailed below, may be used for further processing and verification of the update data. By transforming the update data into the canonicalized format, the values of the parameters for the executable may be conformed from their initial, and possibly different, representations included within the update data into a standardized format.

For example, the canonicalized format may include a routing data structure based on extracting information from smart contracts. For example, conformant ERC-20 tokens emit Approval events of the form Approval (address owner, address spender, uint256 value) when a token owner initiates a transaction that allows the spender to transfer tokens from their balance (as described in FIG. 5 below). The routing data structure may include an index of all Approval events to a single contract. The routing data structure may indicate a token type and quantity that can later be used by the smart contract to initiate a swap.

As an example, referring again to FIG. 3A, a canonicalized data structure 306 may include parameter values 308. Parameter values 308 may represent parameter values 304 from update data 302 in a canonicalized format. For example, for single-sided pricing, canonicalized data structure 306 may be represented as:
 Exchange Identifier
 Instrument A Identifier
 Instrument B Identifier
 Price
 Quantity
 Side
 Timestamp (or sequence number)
As another example, canonicalized data structure 306 for two-sided pricing may be represented as:
 Exchange Identifier
 Instrument A Identifier
 Instrument B Identifier
 Ask Price
 Bid Price
 Ask Quantity
 Bid Quantity
 Timestamp (or sequence number)
As seen from both the single-sided pricing data structure and the two-sided pricing data structure, the format of canonicalized data structure 306 (e.g., the canonicalized format) standardizes the information that is included in update data 302. Some embodiments include additional parameters for the single-sided pricing data structure, the two-sided pricing structure included, or both. For example, decimalization, minimum and/or maximum quantities, internal identifier to symbol mapping and the like may also be included in either data structure or may be included in metadata associated with either data structure.

In some embodiments, transformation subsystem 114 may be further configured to transform the canonicalized data structure into a network-specific data structure. As an example, referring again to FIG. 3A, canonicalized data structure 306 may be transformed to network-specific data structure 310 including network-specific parameter values 312 represented using a network-specific format. In some embodiments, network-specific data structure 310 may refer to a data structure having the parameter values formatted in a network-specific format associated with a network that the executable is stored on. For example, if the executable is a smart contract on the Ethereum blockchain, then the network-specific format would refer to a format specific to the programming characteristics of the Ethereum blockchain. In Ethereum, for instance, smart contracts may be written in Solidity, which is a language library specific to the Ethereum blockchain. In some embodiments, the network-specific format is variable for a given network. For example, the network-specific format for the Ethereum blockchain may be variable. For example, FIG. 5 shows illustrative interfaces for an ERC-20 smart contract, in accordance with one or more embodiments.

In some embodiments, network-specific data structure 310 including network-specific parameter values 312 represented using a network-specific format for single-sided pricing may have the following representation:
 bytes32
 bytes32
 bytes32
 uint256
 uint256
 boolean
 uint256
Similarly, network-specific data structure 310 including network-specific parameter values 312 represented using a network-specific format for two-sided pricing may have the following representation:
 bytes32
 bytes32
 bytes32
 uint256
 uint256
 uint256
 uint256
 uint256
The term "bytes32" refers to a 32-byte string of characters used to store data, where the data type, "byte," represents a sequence of bytes. "Bytes" represents a dynamic array of bytes, and in Solidity, variables can be defined using "byte[s]". Various operations may be performed on variables defined in each data structure depending on the task(s) to be performed (e.g., AND, OR, XOR, NEGATION, etc.). In addition, addresses may also be encoded using the bytes array. The term "uint256" refers to another data type in Solidity, a number that is stored in 256 bits of unsigned numbers ranging from 0 to $2^{256}$. The term "boolean" refers to a value type that can be used to represent scenarios with binary outcomes (e.g., TRUE, FALSE). The boolean data type is declared and assigned a value.

Although the aforementioned examples refer to the Ethereum blockchain, other platforms may, alternatively, be used. Other cryptographic currencies that may be used include, but are not limited to (which is not to suggest that any other list is limiting), Bitcoin, Ripple, Litecoin, Tether, Libra, Monero, EOS, NEO, and IOTA.

Network-specific parameter values 312, represented by network-specific data structure 310, may be transformed from a canonicalized format to a corresponding network-specific format. For example, parameter values 308 of canonicalized data structure 306 may include an "Exchange Identifier," "Instrument A Identifier," and "Instrument B Identifier," and may be transformed to the network-specific parameter values 312 represented as an instance of "bytes32" in network-specific data structure 310. Each of the parameter values "Exchange Identifier," "Instrument A Identifier," and "Instrument B Identifier" may therefore be represented in network-specific data structure 310 by a 32-bit dynamic array (which may or may not include padding). As another example, parameter values 308 of canonicalized data structure 306 may include "Price," "Quantity," and "Timestamp," and may be transformed into a network-specific parameter that values 312 represented as instances of "uint256" in network-specific data structure 310. Each of the parameter values, "Price," "Quantity," and "Timestamp," may therefore be represented in network-specific data structure 310 by a number having 256 bits ranging between 0 and $2^{256}$. As yet another example, parameter values 308 of canonicalized data structure 306 may include "Side," and may be transformed to network-specific parameter values 312 represented as an instance of the variable "boolean". The parameter value "Side" may therefore be represented in network-specific data structure 310 by a value that is declared and assigned in the corresponding executable.

In some embodiments, transformation subsystem 114 may be configured to transform canonicalized data structure 306 into a plurality of network-specific data structures (e.g., multiple instances of network-specific data structure 310), each associated with a different network. For example, transformation subsystem 114 may be configured to transform canonicalized data structure 306 into a first network-specific data structure associated with a first decentralized network, a second network-specific data structure associated with a second decentralized network, a third network-specific data structure associated with a third decentralized network, and so on. Each of the transformations may be performed serially or in parallel. For example, a multi-processor computing system may be configured to distribute the transformation processing to different cores such that each core processes a different transformation of the canonicalized data structure.

In some embodiments, transformation subsystem 114 may be configured to obtain a network identifier associated with the decentralized network (or networks) into which canonicalized data structure 306 is to be transformed. The network identifier may be obtained in an initial request received by server 102 to perform the transformations, stored in metadata associated with the message received by data retrieval subsystem 112, derived from the update data, or from other indicators. Based on the network identifier, transformation subsystem 114 may retrieve, access, or otherwise initialize, rules for performing one or more transformations in order to generate the network-specific data structure for the specified network.

Cryptographic subsystem 116 may be configured to encrypt the network-specific data structure. In some embodiments, cryptographic subsystem 116 may encrypt the network-specific data structure (e.g., network-specific data structure 310) using asymmetric cryptography, however other cryptography techniques may additionally or alternatively be used. Cryptographic subsystem 116 may also be configured to perform decryption, as described below. The asymmetric cryptographic process refers to a one-way encryption where the encrypted data is easy to generate (e.g., via a mathematical algorithm) but virtually impossible to decrypt without knowledge of the corresponding key for decryption.

In some embodiments, cryptographic subsystem 116 may hash the network-specific data structure to generate a hash value for the network-specific data structure. The hash value may be a bit array that is generated by taking a string of an arbitrary size and inputting the string into a function, referred to as a cryptographic hash function, or hash function. As mentioned above, the hash function may sometimes be referred to as a one-way function. A cryptographic hash function is deterministic and produces a single hash value for a given input (e.g., message) such that two different inputs cannot produce the same hash value. Some example cryptographic hash functions include, but are not limited to (which is not to imply that any other list is limiting), MD5, SHA-1, SHA-2, SHA-3, RIPEMD-160, and BLAKE3. The hash value that is generated by cryptographic subsystem 116 may be stored in local cache on server 102 and may be used for verification of the update data.

Figure 3B:
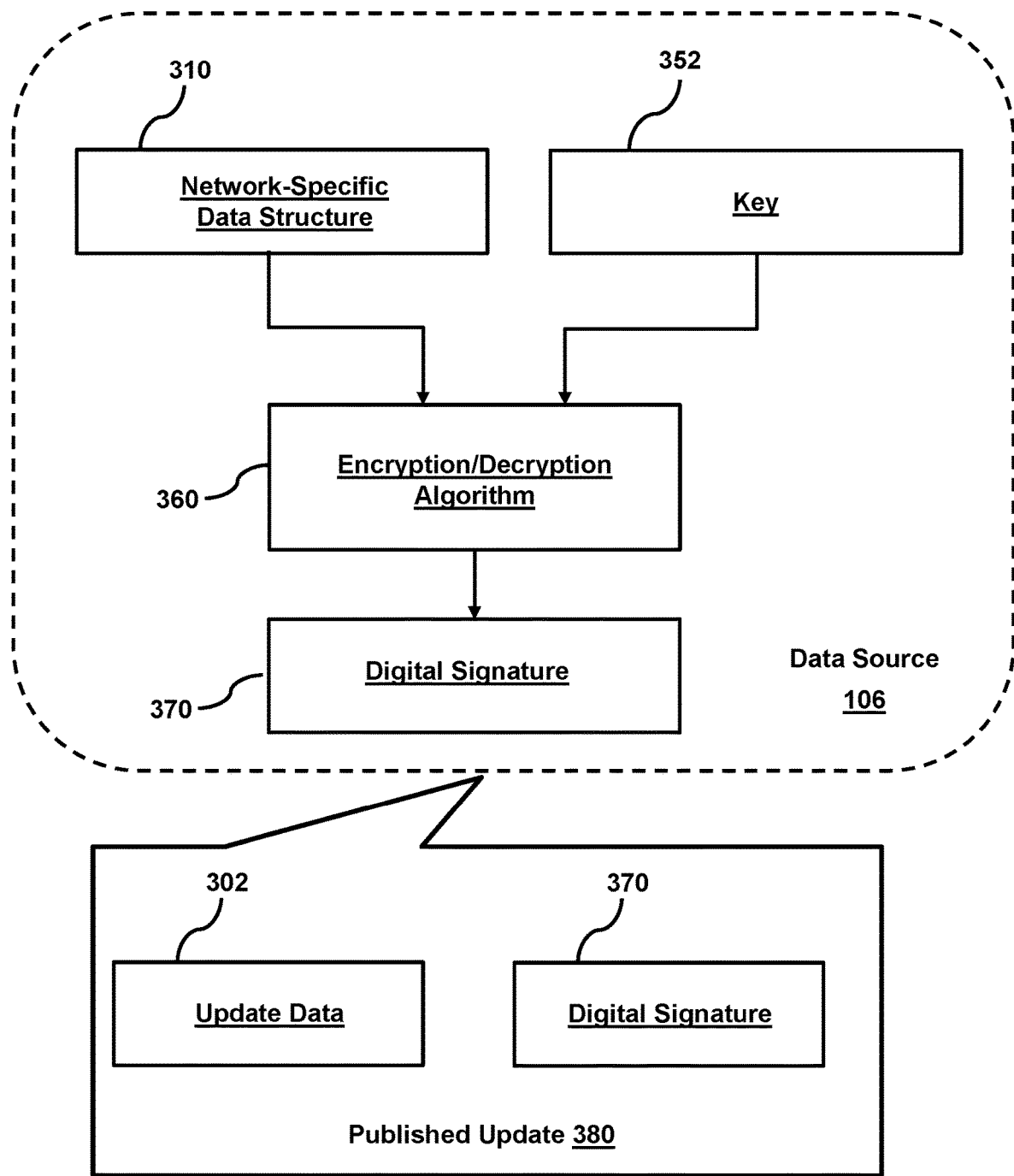

In some embodiments, server 102, data source 106, or server 102 and data source 106 together may be configured to generate a digital signature for a network-specific data structure. As an example, with reference to FIG. 3B, data source 106 may generate network-specific data structure 310 based on an update to data associated with data source 106. For example, upon a price of a stock changing (e.g., increasing or decreasing), data source 106 may generate a market update indicating the changed price of the stock. As mentioned previously, the update data (e.g., update data 302) may be used to generate network-specific data structure 310 by performing one or more transformations. In some embodiments, data source 106 may generate a canonicalized data structure (e.g., canonicalized data structure 306) based on the update data that data source 106 generated. Some embodiments may further include data source 106 generating one or more network-specific data structures (e.g., network-specific data structure 310) based on the canonicalized data structure, where each of the network-specific data structures includes parameter values for the update data represented in a corresponding, network-specific format.

In some embodiments, data source 106 may generate a digital signature based on network-specific data structure 310 and a private key of data source 106. Public/private key signing algorithms use a first key for encrypting data and a second, different key for decrypting the data. Each party of the system (e.g., a sender, a recipient) will have two keys: a public key published to all members of the system, and a private key known only to a specific party. In some embodiments, to encrypt data, such as network-specific data structure 310, a sender (e.g., data source 106) may use an intended recipient's public key (e.g., server 102, client device 104) and the recipient may use its private key to decrypt the data. In some embodiments, a sender (e.g., data source 106) may use their private key to encrypt the data, and the recipient (e.g., server 102, client device 104) will use the sender's public key to decrypt the data.

In some embodiments, data source 106 may be configured to obtain network-specific data structure 310 and key 352. Key 352 may be a private key or a public key associated with data source 106. For example, if key 352 is the private key associated with data source 106, then the corresponding public key of data source 106 will be published for use in decrypting messages (e.g., digital signatures) generated and published by data source 106.

In some embodiments, network-specific data structure 310 and key 352 may be provided to an encryption/decryption algorithm 360. Encryption/decryption algorithm 360 may be configured to generate a digital signature 370 using a cryptographic algorithm based on network-specific data structure 310 and key 352 (e.g., a private key associated with data source 106). Various types of mathematical algorithms can be used to produce, encrypt, and decrypt, and may also be used to generate public and private keys. For example, the RSA algorithm, the DSS algorithm, and elliptic curve cryptography may be used to perform encryption and decryption, and may also be used for public/private key generation. As an example, the Ethereum blockchain uses an Elliptical Curve Digital Signature Algorithm (ECDSA) for generating digital signatures, and ECDSA may also be used for key generation. To generate the keys, a random large number is generated and stored in a secure location (e.g., a digital wallet). Using the private key, a public key may be generated. In ECDSA, the public key may correspond to a location (e.g., an (x, y) point) on an elliptical curve, and the private key is used as a scalar multiplier. For instance, the location is multiplied by itself a number of times, where the number of times is equal to the scaler (i.e., the private key).

ECDSA may also be used for encryption/decryption. For example, if a first party wants to send a signed message (e.g., a digital signature) to a second party, the two parties first agree on a set of parameters. The set of parameters may include a functional representation of the elliptical curve (e.g., f(x)), a base point along the curve, B, and an order of the curve, n, where n is a prime number. The first party generates a private key, $k_{private}$, and a public key, $k_{public}$, where $$k_{public} = k_{public} \times B \qquad \text{Eq. 1.}$$

When the first party signs the message, a hash is generated by computing W(M), where M is the message to be sent, and W( ) is a cryptographic hash function. A cryptographic hash function refers to a hash function that is deterministic and produces a single hash value for a given input (e.g., message) such that two different inputs cannot produce the same hash value. Some example cryptographic hash functions include, but are not limited to (not to imply that other lists are limiting) MD5, SHA-1, SHA-2, SHA-3, RIPEMD-160, and BLAKE3. A random integer i is selected from the interval [1, n−1] and a point along the elliptical curve f(x) is determined by Eq. 2.

$$(x_1, y_1) = i \times B \qquad \text{Eq. 2.}$$

If $t = x_1 \mod(n)$ is equal to zero, a new random integer is selected and the process is repeated. After a suitable random integer is identified, a leftmost bits of the hash, where l is a bit length of the group order n, is determined and Eq. 3 is computed:

$$S = \frac{1}{i}(l + t\, k_{public}). \qquad \text{Eq. 3}$$

The digital signature is then the pair (t, S). In response to the digital signature being obtained, the receiving party may use the signing party's public key to decode the digital signature. In some embodiments, the digital signature may be an encrypted hash value, generated by hashing data to obtain a hash value, and then encrypting the hash value with the signing party's private key. The hashing algorithm, or an indication of the hashing algorithm, used to obtain the hash value may also be included with the update data, so that the receiving party may perform a verification of the data.

After digital signature 370 is generated, data source 106 may publish update data 302 with digital signature 370 as published update 380. In some embodiments, published update 380 may refer to update data 302 with an additional data field specifying digital signature 370. For example, published update 380 may include update data 302 with an additional data field added to its data structure used to store digital signature 370. In some embodiments, published update 380 may be accessible by any entity that accesses data source 106. For instance, published update 380 may be retrieved by a party in response to submitting a request to data source 106, by a data feed periodically or dynamically output by data source 106 (e.g., an RSS feed), or by other publishing mechanisms.

In some embodiments, cryptographic subsystem 116 may further be configured to generate a reference value based on the previously obtained digital signature related to the update data, and a public key associated with the data source. As described below, a verification process will be performed to determine whether a digital signature originated from the specified data source.

In some embodiments, cryptographic subsystem 116 may be configured to generate a reference value based on the digital signature obtained with the update data and a public key associated with the data source. For instance, as indicated previously, the message including the update data may also include the digital signature related to the update data. However, alternatively, the digital signature may be included in metadata associated with the update data. In some embodiments, the update data may include an additional data field that stores the digital signature. Still further, the update data may include information indicating a particular hashing algorithm used for the generation of the digital signature. The data source may publish their public key to members of the system. In this way, cryptographic subsystem 116 may derive the reference value from the digital signature by using the public key associated with the data source to decrypt the digital signature. Some embodiments include hashing the output of the decryption (e.g., the decryption of the digital signature via the public associated with the data source) using the same hashing algorithm indicated as having been used to generate the digital signature. The hashed output of the decryption may be referred to as the reference value, which may be used with the hash value to verify the message and the data source.

In some embodiments, an additional message and an additional digital signature related to the additional message may be obtained. The additional message may be similar to the aforementioned message. For example, the additional message may include additional update data representing an update from an additional data source. In some embodiments, data retrieval subsystem 112 may be configured to obtain the additional message and the additional digital signature. The additional message may include an additional source identifier associated with the additional data source that is indicated as having published the additional message, and may also include additional values associated with one or more additional parameters for the executable.

In some embodiments, the additional message may be transformed into an additional network-specific data structure having the network-specific format associated with the network. For instance, transformation subsystem 114 may be configured to transform the additional message, which may include the additional update data, into the additional network-specific data structure. The additional values may represented in the network-specific format. In some embodiments, the additional update data included by the additional message may be transformed to a canonicalized data structure have a canonicalized format different from the format of the update data and may represent the parameter values of the additional update data in the canonicalized format. In some embodiments, the canonicalized data structure generated by the transformation of the additional update data may be further transformed, via transformation subsystem 114, to the additional network-specific data structure (e.g., as described in FIG. 5 below).

In some embodiments, an additional verification of the additional network-specific data structure may be performed based on the additional digital signature. For instance, verification subsystem 118 may be configured to perform the additional verification. In some embodiments, cryptographic subsystem 116 may be configured to generate a hash value of the additional network-specific data structure and generate a reference value based on the additional digital signature and a public key associated with the additional data source. Verification subsystem 118 may determine whether the hash value of the additional network-specific data structure, the reference value based on the additional digital signature and the public key associated with the additional data source match.

Publication subsystem 120 may be configured to provide the additional values from the network-specific data structure to the executable based on the additional verification indicating a match between the additional network-specific data structure and the additional digital signature. For example, if the hash value of the additional network-specific data structure and the reference value based on the additional digital signature and the public key associated with the additional data source match, then a match indicator (e.g., match indicator 410) may be output, whereas, if no match is determined, then a no match indicator (e.g., no match indicator 412) may be output. In some embodiments, the executable may be configured to initiate the update to the network based on the values and the additional values. For example, the update may be initiated based on an average of the values and the additional values, an aggregation of the values and the additional values, a weighted combination of the values and the additional values, or other combinations.

In some embodiments, the messages from a data source may be obtained periodically to create candlestick pricing. For example, a message may be obtained every 5 minutes, 10 minutes, 30 minutes, etc. The parameter values indicated by the update data from each obtained message may indicate an expected value for a given parameter at a future point in time. For example, based on the price of stock at various time intervals, the future price may be predicted. In some embodiments, a quantitative model may be generated based on a plurality of verified prices. The quantitative model may be used to compute a price for a future time based on the plurality of verified prices. Some types of quantitative models that may be used include the capital asset pricing model, the Black-Scholes model, or other asset pricing models. In some embodiments, a single offline quantitative model may be replicated across multiple participants, which may each calculate results based on a given message. The results may then be used for determined settlements, trading processes, reporting, or other aspects.

In some embodiments, the update data signed with the digital signature may be used to reprice network instruments with arbitrary settlement parameters. This may allow information to be provided at any time to verify the value of an asset, which improves swapping and trading flows without inefficient or inaccurate pricing algorithms. Additionally, the update data signed with the digital signature may enable synthetic instruments to be generated, which may be real time proxies of tokens or traditional financial instruments.

Figure 4:
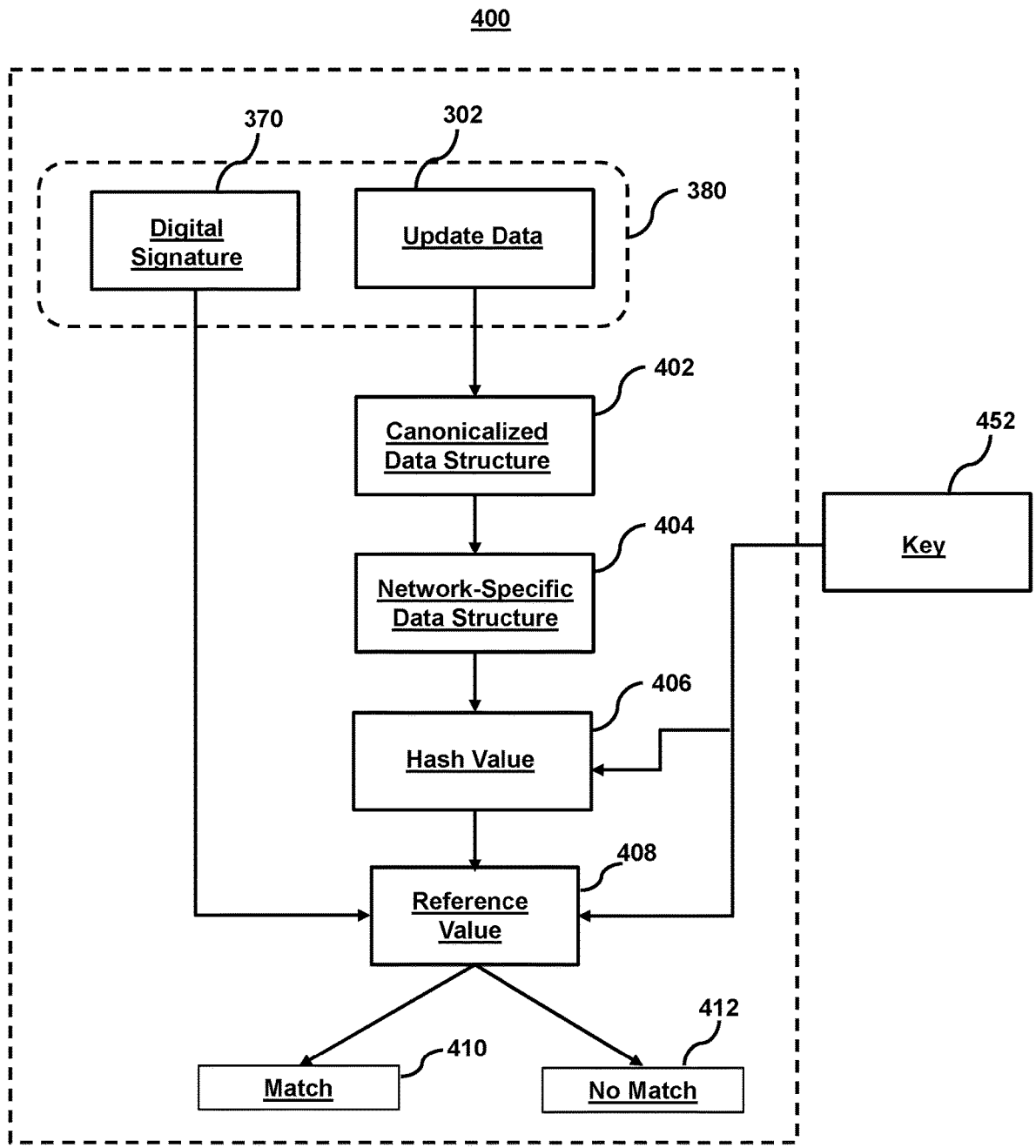
FIG. 4 shows a diagram demonstrating performance of cryptographically verification of update data, in accordance with one or more embodiments.

In some embodiments, verification subsystem 118 may be configured to perform a verification of the parameter values from the update data based on the hash value and the reference value. For example, with reference to FIG. 4, a verification process 400 may be performed to determine whether parameter values included by update data 302 of published update 380 are verifiable and able to be used as an executable on a decentralized network. In some embodiments, verification process 400 may obtain published update 380 from data source 106, from another party, or from another entity (e.g., a data feed). Verification process 400 may be used to verify that update data 302 included by published update 380 was generated by data source 106 and has not been augmented in any way by any intervening parties.

In response to receiving published update 380, update data 302 may be extracted from the published update 380. From update data 302, a canonicalized data structure having a canonicalized format may be generated. For example, as described above with respect to transformation subsystem 114, update data 302 may be transformed into canonicalized data structure 402, having the canonicalized format. Canonicalized data structure 402 may be the same or similar to canonicalized data structure 306 of FIG. 3A and the previous description may apply. For instance, parameter values of canonicalized data structure 402 may be the same or similar to parameter values 308 of canonicalized data structure 306. The parameter values of canonicalized data structure 402 may represent parameter values of update data 302 (e.g., values associated with parameters for an executable) in the canonicalized format. In some embodiments, the executable may be stored on a network, such as a decentralized network.

In some embodiments, a network-specific data structure 404 may be generated based on canonicalized data structure 402. Network-specific data structure 404, which may be the same or similar to network-specific data structure 310, may include representations of the parameter values from update data 302 having a network-specific format. Some embodiments include the network-specific format using data types particular to the decentralized network that an executable is stored on. For example, if the executable is a smart contract stored on the Ethereum blockchain, then the parameter values may take a form specified by the Solidity programming language. This may include representing parameter values as bytes32 variables, uint256 arrays, boolean operators, or others. In some embodiments, one or more network-specific data structures, each associated with a specific network with which a corresponding smart contract may be stored, may be generated.

In some embodiments, verification subsystem 118 may generate a hash value based on the generated network-specific data structure. For example, hash value 406 may be generated by hashing network-specific data structure 404. Hash value 406 may be generated using a cryptographic hashing algorithm, as described above. The cryptographic hashing algorithm may be specified by update data 302, published update 380, or may be indicated based on the specific decentralized network for which network-specific data structure 404 was generated. In some embodiments, network-specific data structure 404 may be hashed using an encryption/decryption algorithm. The encrypted hash value may be based on hash value 406 and key 452. In some embodiments, key 452 may be a public key associated with data source 106 (e.g., the entity that is indicated as having encrypted digital signature 370).

In some embodiments, verification subsystem 118 may generate a reference value based on digital signature 370 included by published update 380 and key 452. As mentioned previously, data source 106 may generate digital signature 370 as a mechanism for an end user to verify that update data 302 was generated by data source 106, not by (or otherwise augmented by) another entity. In some embodiments, an encryption/decryption algorithm may be used to generate a decrypted version of the reference value 408. For example, reference value 408 may be decrypted to determine whether the underlying input to the hashing algorithm was used to create digital signature 370 maps to hash value 406. In some embodiments, hash value 406 and reference value 408 may be stored in a local cache.

Verification process 400 may include comparing hash value 406 and reference value 408 to determine a similarity score. In some embodiments, the similarity score may be a binary score of TRUE (e.g., the hash value and the reference value are identical) or FALSE (e.g., the hash value and the reference value are not identical). As mentioned previously, because the hash function is a one-way function whereby no two different inputs can yield the same output, the only way for the similarity score to be TRUE is if the reference value and the hash value are the same. A similarity score of TRUE indicates that the update data received is verified as being the update data generated by the data source. A similarity score of FALSE indicates that the update data is not verified as being the update data generated by the data source. While a similarity score of FALSE does not imply that the update data, or the parameter values represented by the update data, are incorrect, it does mean that the receiver of the message including the update data cannot know for certain that the data that has been received is the most accurate data available (e.g., the data generated by the data source).

In some embodiments, if the digital signature used to generate reference value 408 is, in fact, digital signature 370 generated by data source 106, then reference value 408 should be identical to hash value 406. If the similarity score is TRUE, indicating that reference value 408 and hash value 406 are identical, verification process 400 may output a match indicator 410 to indicate that reference value 408 and hash value 406 match. Output of match indicator 410 may indicate that the parameter values represented by update data 302 in the first format may be used for the parameters of the executable. For example, upon the verification process 400 indicating that update data 302 is verified as having originated from data source 106, the parameter values represented by update data 302 may be extracted and provided to the executable to facilitate an update to the decentralized network. In some embodiments, the parameter values may serve as inputs for a smart contract on a blockchain, and based on the inputs, the smart contract may add a new block (or determine whether a new block should be added) to the blockchain. If the digital signature used to generate reference value 408 is not digital signature 370 generated by data source 106, then reference value 408 should not be identical to hash value 406. In such cases, the similarity score is FALSE, indicating that reference value 408 and hash value 406 do not match, and no match indicator 412 may be output by verification process 400. In this example, parameter values associated with the updated data included in the published update 380 that was retrieved should not be provided to the executable because the parameter values have not been verified.

Publication subsystem 120 may be configured to publish the message including the update data, which may include an additional field indicating the digital signature of the network-specific data structure. For example, published update 380 may include update data 302 with an additional data field including digital signature 370. In some embodiments, after the update data has been transformed into the network-specific data structure having parameter values of the update data represented in a network-specific format, the digital signature of the network-specific data structure may be generated. The generated digital signature of the network-specific data structure may be included within an additional data field of the message, which publication subsystem 120 may publish. By publishing the message (e.g., the message, the update included in the message, additional information related to the message, etc.), the message may be accessible to entities accessing the data source. One or more parties may access the data source (e.g., by visiting a URL or IP address associated with the data source) and may retrieve the message. The message may then be passed to one or more parties and, at any point, the message's data may be verified using the digital signature specified by the additional data field of the message and the public key associated with the data source.

Some embodiments may also include publication subsystem 120 providing the network-specific data structure to an executable on a decentralized network. For example, the network-specific data structure, in response to a verification process indicating that update data has been verified as originating from a particular data source, may be provided to a smart contract on a decentralized network. For instance, the smart contract may be located at a specific address or addresses on the decentralized network.

In some embodiments, an executable on a decentralized network, responsive to being provided parameter values (e.g., after verification of corresponding update data), may be configured to extract the parameter values from the network-specific data structure. Some embodiments include the extracted parameter values being in the network-specific format. For example, for the Ethereum blockchain, the extracted parameter values may be network-specific parameter values 312. In some embodiments, extraction of the parameter values from the network-specific data structure may include transforming the network-specific data structure to obtain the parameter values of the update data in the first format from the parameter values of the update data in the network-specific format. This may include one or more transformations, such as transforming the network-specific data structure representing the parameter values of the update data in the network-specific format to the canonicalized data structure representing the parameter values of the update in the canonicalized format, followed by transforming the canonicalized data structure representing the parameter values of the update in the canonicalized format to the update data having the parameter values in a first format. Some embodiments may include extracting the parameter values in the first format from the update data. For example, the update data may be provided to the executable. For instance, the update data may be retrieved from the data source and provided to the executable, or may be sent as an additional, or associated, message from the sending party of the update data. Some embodiments may further include the parameter update values represented in the first format obtained from the verified digital signature. For example, using the public key associated with the data source, the digital signature of the message may be decrypted to generate the update data.

In some embodiments, the executable may be used to verify the digital signature over the canonical form if the executable has the public key of the corresponding data source explicitly, or if the public key is defined in the executable. Alternatively, the public key may be derived from the digital signature provided to the executable, or if the public key used to sign the update data is provided as part of the executable call.

In some embodiments, the executable may be generated specifically for performing the verification process. The executable (e.g., a smart contract) may then be stored on the decentralized network. In some embodiments, other executables may use the executable as a service to verify messages, such that the other executables do not need to perform the transformations (e.g., transformation to canonicalized data structures, transformation to network-specific data structures) or verifications.

In some embodiments, ledger update subsystem 122 may be configured to initiate an update to the decentralized network based on the extracted parameter values. In some embodiments, the executable may be configured to initiate the update based on one or more conditions associated with the executable being met. For example, the condition may include determining whether the hash value generated based on the network-specific data structure, and the reference value generated based on the digital signature and the public key associated with the data source, match. If the hash value and the reference value match, then the conditions may be satisfied. If the hash value and the reference value do not match, then the conditions may not be satisfied.

Ledger update subsystem 122 may store a blockchain. As an example, the blockchain may include one or more blocks. Each of the blocks may include one or more blockchain transactions. Each of the blockchain transaction may involve a primary token of the blockchain (e.g., Ether is the primary token of the Ethereum blockchain). As another example, each of the blocks may be linked to an immediately prior block in the blockchain. Each of the blocks may be secured using cryptography. In one use case, each block may contain a hash pointer as a link to an immediately prior block, a timestamp, and transaction information (related to one or more transactions), or other information. As another example, the blockchain may be obtained from one or more sources. The blockchain may be updated by obtaining one or more portions of the blockchain stored at one or more sources (e.g., by syncing the stored blockchain with the portions obtained from multiple sources, by verifying that the portions obtained from one source match corresponding portions obtained from one or more other sources, etc.). Additional details regarding blockchains and tokens (e.g., primary tokens, secondary tokens, etc.) for blockchain transactions are described in U.S. Pat. No. 10,581,591, entitled "Probabilistic secondary token issuance on a blockchain based on burning of a primary token of the blockchain," which issued Mar. 3, 2020 having common inventorship, and the disclosure of which is hereby incorporated by reference in its entirety.

In some embodiments, each blockchain transaction may be associated with the update. The blockchain transaction may indicate an amount of funds dispersed or to be dispersed from a first party to a second party based on the rules of a smart contract and the verified update data. As an example, a smart contract on the blockchain may be configured to initiate an update based on parameter values of a market update. The update may be to award a predetermined amount of funds to a first party (from a second party) based on whether the first party correctly predicted a binary option. For instance, the binary option may award a certain amount of funds to a first party if the first party correctly determined whether the value of the stock is above or below a predicted strike price expiring at a predetermined time. If the first party correctly predicted the value, then the smart contract may initiate the update on the blockchain, causing a block to be added to the blockchain including a blockchain transaction reflecting the predetermined amount of funds being provided to the first party (from the second party). If the first party did not correctly predict the value, then the smart contract may initiate an update on the blockchain, causing a block to be added to the blockchain including a blockchain transaction reflecting the predetermined amount of funds being retrieved from the first party (and provided to the second party). In order for the smart contract to execute the parameter values, which, for example, indicate the price of a stock at a given time, are obtained and verified as having originated from a trusted data source, such as a financial exchange that generated the market update, or other data source.

In some embodiments, upon confirmation of the price execution, a token may be generated. For example, after confirming one or more prices based on the update data and the digital signature, cryptocurrency may be generated in accordance with the terms of the executable. One or more tokens, having a value associated with the amount to be awarded from the executable, may be generated and awarded to a winning party. As an example, if Party A accurately predicts a price of an option at expiry, then a smart contract may generate a token or tokens stipulated by the smart contract, and award the token(s) to Party A.

In some embodiments, the update data may include a plurality of prices or price updates. The update data including the plurality of prices may then be used to generate a digital signature for the update data. For example, the update data including the plurality of prices may be used to generate a canonicalized data structure, the canonicalized data structure may be used to generate a network-specific data structure, and the network-specific data structure may be used to generate a digital signature for the update data. In some embodiments, another executable may be configured to request a price for one or more of the plurality of stocks included by the updated data. For example, an application may submit an application programming interface (API) call to retrieve a price for a given stock. The API call may specify a given stock (e.g., via an instrument ID associated with the stock) and a quantity for the price. Server 102 and/or data source 106 may then provide the verified stock price to the application as a response to the API call.

FIG. 5 shows an exemplary network-specific data structure having a network-specific format associated with the network. For example, data structure 500 may represent an interface common to a plurality of smart contracts. The data structure 500 may signal to other smart contracts that a smart contract corresponding to data structure 500 implements a specific set of functions (e.g., ERC-20 tokens).

Data structure 500 includes several functions and events. For example, at line 5, data structure 500 include a total supply function. The total supply function returns the amount of tokens in existence.

At line 6, data structure 500 includes a balance of function. The balance of function returns the amount of tokens owned by an account. At line 7, data structure 500 includes an allowance function. The allowance function returns the remaining number of tokens that a spender will be allowed to spend on behalf of an owner through a transfer from function. This is zero by default. This value may change when approve or transfer events occur.

At line 9, data structure 500 includes a transfer function. The transfer function moves the amount of tokens from the caller's account to recipient. The transfer function returns a boolean value indicating whether the operation succeeded. The transfer function emits a transfer event. At line 10, data structure 500 includes an approve function. The approve function sets an amount as the allowance of spender over the caller's tokens. At line 11, data structure 500 includes a transfer from function. The transfer from function moves the amount of tokens from sender to recipient using the allowance mechanism. amount is then deducted from the caller's allowance. The transfer from function returns a boolean value indicating whether the operation succeeded. The transfer from function emits a Transfer event. At line 14, data structure 500 includes a transfer event. The transfer event is emitted when value tokens, which may be zero, are moved from one account (from) to another (to). At line 15, data structure 500 includes an approval event. The approval event is emitted when the allowance of a spender for an owner is set by a call to approve. The value is the new allowance.

The approval event has the format "approval(address owner, address spender, uint256 value)". For example, an ERC-20 token may emit the approval event in this form when a token owner initiates a transaction that allows the spender to transfer tokens from their balance. When the spender is the address of a smart contract there is an explicit intention to yield control to that contract's function. If the contract function enables a swap based on a signed price then the explicit Approval has conveyed that the user will swap liquidity based on the rules of the contract.

In some embodiments, the contract function may cause an indexing of all approval events. This indexing creates a liquidity routing table (e.g., a routing data structure) that may be stored as part of the smart contract. For example, this information may comprise a canonical update as described above in FIGS. 3A-B. In subsequent transactions, the function may iterate over all approval events to the contract from a creation time until the latest block (e.g., as described in FIG. 2 above), followed by a balance of function call prior to returning data to any calling function. For example, the balance of function returns the amount of tokens owned by an account, which based on the routing data structure would now indicate a token type and token quantity that can be used by the contract to initiate a swap. Additionally or alternatively, the routing data structure may indicate all transfer events. By iterating through the transfer events, the function may determine the amount of tokens owned by the account.

Figure 6:
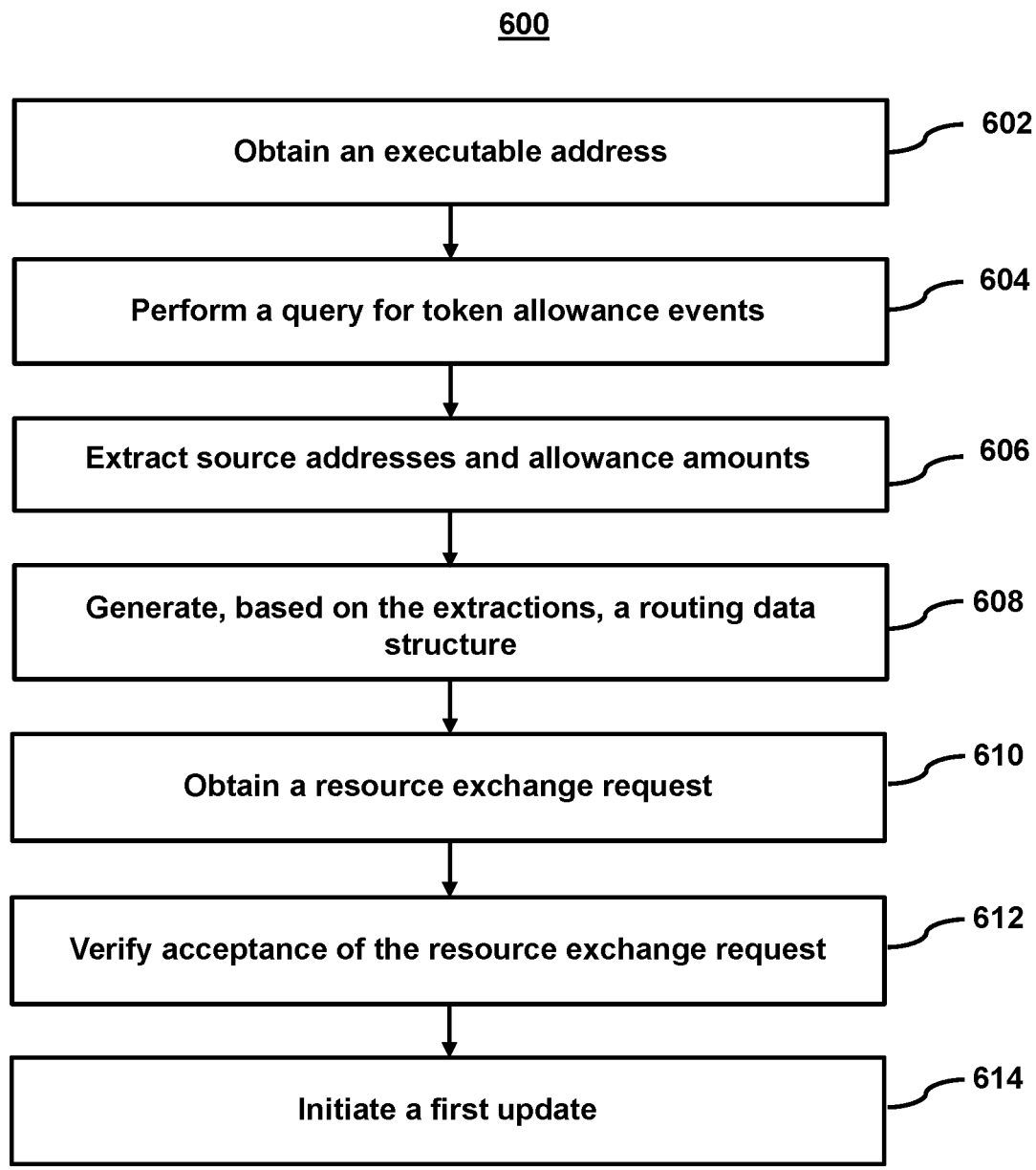
FIG. 6 shows a flowchart of a process system for introducing self-contained intent functionality into decentralized computer networks, in accordance with one or more embodiments.

FIG. 6 shows a flowchart of a process system for introducing self-contained intent functionality into decentralized computer networks, in accordance with one or more embodiments. For example, process 600 may represent the steps taken by one or more devices as shown in FIGS. 1-5 for introducing self-contained intent functionality. For example, the system may use a permission structure native to one or more cryptocurrencies, non-fungible tokens, or other tokens to provide additional functionality that allows for an intent to be introduced into an executable (e.g., a smart contract). This intent may be introduced using a routing data structure indicating exchange eligibility of resource sources (e.g., liquidity map).

At step 602, process 600 obtains (e.g., using one or more components of system 100 (FIG. 1)) an executable address.

For example, the system may obtain an executable address associated with an executable on a decentralized network. In some embodiments, the system may perform process 600 with respect to each executable of first and second executables on first and second decentralized networks, respectively.

At step 604, process 600 performs (e.g., using one or more components of system 100 (FIG. 1)) a query for token allowance events. For example, the system may perform, based on the executable address, a query for token allowance events associated with the executable, the token allowance events being stored in cryptographically-linked data structures of the decentralized network.

In some embodiments, the system may determine, based on the executable address, a first data structure of cryptographically-linked data structures associated with the decentralized network, wherein the first data structure corresponds to a creation time associated with an executable on the decentralized network, the creation time corresponding to a time that the executable is created on the decentralized network. The system may then iterate, based on the executable address, over token allowance events associated with the executable from the first data structure until a latest data structure of the cryptographically-linked data structures.

At step 606, process 600 extracts (e.g., using one or more components of system 100 (FIG. 1)) source addresses and allowance amounts. For example, the system may extract, from the token allowance events, source addresses associated with network tokens of the decentralized network and allowance amounts associated with the network tokens, wherein each of the network tokens corresponds to a resource related to the decentralized network. In some embodiments, extracting, from the source addresses associated with network tokens of the decentralized network and the allowance amounts associated with the network tokens comprises executing a balance of function call for each of the source addresses.

At step 608, process 600 generates (e.g., using one or more components of system 100 (FIG. 1)), based on the extractions, a routing data structure. For example, the system may generate, based on the extractions, a routing data structure indicating exchange eligibility of resource sources. In some embodiments, the routing data structure indicating exchange eligibility of resource sources comprises an approval event form indicting a positive integer of a 256 bit size. For example, in some embodiments, the routing data structure may comprise an index of approval events of the form Approval(address owner, address spender, uint256 value). In such cases, the uint256 value may comprise an unsigned (meaning this value can only represent positive integers, not positive and negative integers) integer having 256 bits in size.

At step 610, process 600 obtains (e.g., using one or more components of system 100 (FIG. 1)) a resource exchange request. For example, the system may obtain a resource exchange request for exchanging one or more resources of the first decentralized network. For example, the resource exchange request may indicate a transaction using one or more executables, which may comprise a smart contract.

At step 612, process 600 verifies (e.g., using one or more components of system 100 (FIG. 1)) acceptance of the resource exchange request. For example, the system may verify acceptance of the resource exchange request based on the routing data structure in response to obtaining the resource exchange request.

At step 614, process 600 initiates (e.g., using one or more components of system 100 (FIG. 1)) a first update. For example, the system may initiate a first update to the decentralized network in response to verifying the acceptance of the resource exchange request based on the routing data structure. In some embodiments, the executable comprises first data represented in a first format (e.g., a network-specific format). In such cases, the system may transform the first data represented in the first format into a first data structure having a second format differing from the first format. Furthermore, the first data structure may represent the values associated with the one or more parameters in the second format, wherein transforming the executable into the network-specific data structure comprises transforming the first data structure into the network specific data structure.

In some embodiments, the system may further include obtaining a public key associated with the data source. The system may then generate a reference value based on the digital signature and the public key associated with the data source, wherein the verification of the network-specific data structure is based on the reference value. Additionally or alternatively, the system may perform the verification of the network-specific data structure by generating a hash value of the network-specific data structure and determining that the hash value and the reference value match, wherein the values are provided to the executable based on the verification indicating that the hash value and the reference value match.

It is contemplated that the steps or descriptions of FIG. 6 may be used with any other embodiment of this disclosure. In addition, the steps and descriptions described in relation to FIG. 6 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-5 could be used to perform one or more of the steps in FIG. 6.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In some embodiments, the various computers and subsystems illustrated in FIG. 1 may include one or more computing devices that are programmed to perform the functions described herein. The computing devices may include one or more electronic storages (e.g., market update database(s) 130, ledger database(s) 140, or other electric storages), one or more physical processors programmed with one or more computer program instructions, and/or other components. The computing devices may include communication lines or ports to enable the exchange of information with a network (e.g., network 150), or with other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may implement a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities to the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-122, or other subsystems. The processors may be programmed to execute computer program instructions by software; hardware; firmware, some combination of software, hardware, or firmware, and/or other mechanisms for configuring processing capabilities on the processors.

It should be appreciated that the description of the functionality provided by the different subsystems 112-122 described herein is for illustrative purposes, and is not intended to be limiting, as any of subsystems 112-122 may provide more or less functionality than is described. For example, one or more of subsystems 112-122 may be eliminated, and some or all of its functionality may be provided by other ones of subsystems 112-122. As another example, additional subsystems may be programmed to perform some or all of the functionality attributed herein to one of subsystems 112-122.

Although the present application has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining a resource exchange request for exchanging one or more resources of a decentralized network; in response to obtaining the resource exchange request, verifying acceptance of the resource exchange request based on a routing data structure; and in response to verifying the acceptance of the resource exchange request based on the routing data structure, initiating a first update to the decentralized network.

2. The method of any of the proceeding embodiments, comprising: obtaining an executable address associated with an executable on a decentralized network; performing, based on the executable address, a query for token allowance events associated with the executable, the token allowance events being stored in cryptographically-linked data structures of the decentralized network; extracting, from the token allowance events, source addresses associated with network tokens of the decentralized network and allowance amounts associated with the network tokens, wherein each of the network tokens corresponds to a resource related to the decentralized network; and generating, based on the extractions, the routing data structure indicating exchange eligibility of resource sources.

3. The method of any of the proceeding embodiments, wherein performing the query for token allowance events associated with the executable further comprises: determining, based on the executable address, a first data structure of cryptographically-linked data structures associated with the decentralized network, wherein the first data structure corresponds to a creation time associated with an executable on the decentralized network, the creation time corresponding to a time that the executable is created on the decentralized network; and iterating, based on the executable address, over token allowance events associated with the executable from the first data structure until a latest data structure of the cryptographically-linked data structures.

4. The method of any of the proceeding embodiments, wherein the extracting, from the source addresses associated with network tokens of the decentralized network and the allowance amounts associated with the network tokens comprises executing a balance of function call for each of the source addresses.

5. The method of any of the proceeding embodiments, wherein the operations further comprise: obtaining a second executable address associated with a second executable on a second decentralized network; performing, based on the second executable address, a second query for token allowance events associated with the second executable, the token allowance events associated with the second executable being stored in cryptographically-linked data structures of the second decentralized network; extracting, from the token allowance events associated with the second executable, second source addresses associated with second network tokens of the second decentralized network and second allowance amounts associated with the second network tokens, wherein each of the second network tokens corresponds to a resource related to the second decentralized network; generating, based on the extractions, a second routing data structure indicating exchange eligibility of resource sources; obtaining the resource exchange request for exchanging one or more resources of the second decentralized network; in response to obtaining the resource exchange request, verifying acceptance of the resource exchange request based on the second routing data structure; and in response to verifying the acceptance of the resource exchange request based on the second routing data structure, initiating a second update to the second decentralized network.

6. The method of any of the proceeding embodiments, wherein the executable comprises first data represented in a first format, the operations further comprise: transforming the first data represented in the first format into a first data structure having a second format differing from the first format, the first data structure representing the values associated with the one or more parameters in the second format, wherein: transforming the executable into the network-specific data structure comprises transforming the first data structure into the network specific data structure.

7. The method of any of the proceeding embodiments, wherein the operations further comprise: obtaining a public key associated with the data source; and generating a reference value based on the digital signature and the public key associated with the data source, wherein the verification of the network-specific data structure is based on the reference value.

8. The method of any of the proceeding embodiments, wherein performing the verification of the network-specific data structure comprises: generating a hash value of the network-specific data structure; and determining that the hash value and the reference value match, wherein the hash value and the reference value are provided to the executable based on the verification indicating that the hash value and the reference value match.

9. The method of any of the proceeding embodiments, wherein the operations further comprise: causing the hash value and the reference value to be extracted from the network-specific data structure based on the executable for initiating the update to the network.

10. The method of any of the proceeding embodiments, wherein the routing data structure indicating exchange eligibility of resource sources comprises an approval event form indicting a positive integer of a 256 bit size.

11. The method of any of the proceeding embodiments, wherein the operations further comprise: obtaining a message and a digital signature related to the message, the message comprising (i) a source identifier associated with a data source, and (ii) values associated with one or more parameters for the executable; transforming the message into a network-specific data structure having a network-specific format associated with the network, the network-specific format representing the values of the message in the network-specific format; performing a verification of the network-specific data structure based on the digital signature; and providing the values to the executable based on the verification indicating a match between the network-specific data structure and the digital signature, wherein the executable initiates an update to the network based on the values.

12. The method of any of the proceeding embodiments, wherein, prior to message being obtained, the digital signature is generated based on the message.

13. A system comprising means for performing any of the steps as described in any of embodiments 1-12.

14. A tangible, non-transitory, machine-readable medium storing instructions that, when executed by a data processing apparatus, cause the data processing apparatus to perform operations comprising those of any of embodiments 1-12.

15. A system comprising: one or more processors; and memory storing instructions that, when executed by the processors, cause the processors to effectuate operations comprising those of any of embodiments 1-12.

What is claimed is:

1. A system for introducing self-contained intent functionality into decentralized computer networks, comprising:
   memory storing computer program instructions; and
   one or more processors that, when executing the computer program instructions, effectuate operations comprising:
   with respect to each executable of first and second executables respectively on first and second decentralized networks:
      obtaining an executable address associated with the executable on the respective decentralized network;
      determining, based on the executable address, a first data structure of cryptographically-linked data structures associated with the respective decentralized network, wherein the first data structure corresponds to a creation time associated with the executable on the respective decentralized network, the creation time corresponding to a time that the executable is created on the respective decentralized network;
      iterating, based on the executable address, over token allowance events associated with the executable from the first data structure until a latest data structure of the cryptographically-linked data structures; and
      extracting, from the token allowance events, source addresses associated with network tokens of the respective decentralized network and allowance amounts associated with the network tokens, wherein each of the network tokens corresponds to a resource related to the respective decentralized network;
   generating a routing data structure indicating exchange eligibility of resource sources based on the source addresses associated with the network tokens of the respective decentralized network and the allowance amounts associated with the network tokens;
   obtaining a resource exchange request for exchanging a first resource of the first decentralized network for a second resource of the second decentralized network;
   in response to obtaining the resource exchange request, verifying acceptance of the resource exchange request based on the routing data structure; and
   in response to verifying the acceptance of the resource exchange request based on the routing data structure, initiating a first update to the first decentralized network and a second update to the second decentralized network.

2. A non-transitory computer-readable medium storing computer program for introducing self-contained intent functionality into decentralized computer networks comprising instructions that, when executed by one or more processors, effectuate operations comprising:
   obtaining an executable address associated with an executable on a decentralized network;
   performing, based on the executable address, a query for token allowance events associated with the executable, the token allowance events being stored in cryptographically-linked data structures of the decentralized network;
   extracting, from the token allowance events, source addresses associated with network tokens of the decentralized network and allowance amounts associated with the network tokens, wherein each of the network tokens corresponds to a resource related to the decentralized network;
   generating, based on the extractions, a routing data structure indicating exchange eligibility of resource sources;
   obtaining a resource exchange request for exchanging one or more resources of the decentralized network;
   in response to obtaining the resource exchange request, verifying acceptance of the resource exchange request based on the routing data structure; and
   in response to verifying the acceptance of the resource exchange request based on the routing data structure, initiating a first update to the decentralized network.

3. The non-transitory computer-readable medium of claim 2, wherein performing the query for the token allowance events associated with the executable further comprises:
   determining, based on the executable address, a first data structure of cryptographically-linked data structures associated with the decentralized network, wherein the first data structure corresponds to a creation time associated with the executable on the decentralized network, the creation time corresponding to a time that the executable is created on the decentralized network; and
   iterating, based on the executable address, over the token allowance events associated with the executable from the first data structure until a latest data structure of the cryptographically-linked data structures.

4. The non-transitory computer-readable medium of claim 2, wherein the extracting, from the source addresses associated with the network tokens of the decentralized network and the allowance amounts associated with the network tokens comprises executing a balance of function call for each of the source addresses.

5. The non-transitory computer-readable medium of claim 2, wherein the operations further comprise:
   obtaining a second executable address associated with a second executable on a second decentralized network;
   performing, based on the second executable address, a second query for token allowance events associated with the second executable, the token allowance events associated with the second executable being stored in cryptographically-linked data structures of the second decentralized network;
   extracting, from the token allowance events associated with the second executable, second source addresses associated with second network tokens of the second decentralized network and second allowance amounts associated with the second network tokens, wherein each of the second network tokens corresponds to a resource related to the second decentralized network;
   generating, based on the extractions, a second routing data structure indicating exchange eligibility of resource sources;
   obtaining the resource exchange request for exchanging one or more resources of the second decentralized network;
   in response to obtaining the resource exchange request, verifying acceptance of the resource exchange request based on the second routing data structure; and
   in response to verifying the acceptance of the resource exchange request based on the second routing data structure, initiating a second update to the second decentralized network.

6. The non-transitory computer-readable medium of claim 2, wherein the executable comprises first data represented in a first format, and wherein the operations further comprise:

transforming the executable into a network-specific data structure having a network-specific format associated with the decentralized network by transforming the first data represented in the first format into a first data structure having a second format differing from the first format, the first data structure representing values associated with one or more parameters in the second format.

7. The non-transitory computer-readable medium of claim 6, wherein the operations further comprise:
obtaining a public key associated with a data source;
generating a reference value based on a digital signature and the public key associated with the data source; and
performing verification of the network-specific data structure based on the reference value.

8. The non-transitory computer-readable medium of claim 7, wherein performing the verification of the network-specific data structure comprises:
generating a hash value of the network-specific data structure; and
determining that the hash value and the reference value match, wherein the hash value and the reference value are provided to the executable based on the verification indicating that the hash value and the reference value match.

9. The non-transitory computer-readable medium of claim 8, wherein the operations further comprise:
causing the hash value and the reference value to be extracted from the network-specific data structure.

10. The non-transitory computer-readable medium of claim 2, wherein the routing data structure indicating exchange eligibility of resource sources comprises an approval event form indicating a positive integer of a 256 bit size.

11. The non-transitory computer-readable medium of claim 2, wherein the operations further comprise:
obtaining a message and a digital signature related to the message, the message comprising (i) a source identifier associated with a data source, and (ii) values associated with one or more parameters for the executable;
transforming the message into a network-specific data structure having a network-specific format associated with the decentralized network, the network-specific format representing the values of the message in the network-specific format;
performing a verification of the network-specific data structure based on the digital signature; and
providing the values to the executable based on the verification indicating a match between the network-specific data structure and the digital signature, wherein the executable initiates an update to the decentralized network based on the values.

12. The non-transitory computer-readable medium of claim 11, wherein, prior to message being obtained, the digital signature is generated based on the message.

13. A method for introducing self-contained intent functionality into decentralized computer networks comprising:
obtaining, via control circuitry, an executable address associated with an executable on a decentralized network;
performing, via the control circuitry, based on the executable address, a query for token allowance events associated with the executable, the token allowance events being stored in cryptographically-linked data structures of the decentralized network;
extracting, via the control circuitry, from the token allowance events, source addresses associated with network tokens of the decentralized network and allowance amounts associated with the network tokens, wherein each of the network tokens corresponds to a resource related to the decentralized network;
generating, via the control circuitry, based on the extractions, a routing data structure indicating exchange eligibility of resource sources;
obtaining, via the control circuitry, a resource exchange request for exchanging one or more resources of the decentralized network;
in response to obtaining the resource exchange request, verifying, via the control circuitry, acceptance of the resource exchange request based on the routing data structure; and
in response to verifying the acceptance of the resource exchange request based on the routing data structure, initiating, via the control circuitry, a first update to the decentralized network.

14. The method of claim 13, wherein performing the query for the token allowance events associated with the executable further comprises:
determining, based on the executable address, a first data structure of cryptographically-linked data structures associated with the decentralized network, wherein the first data structure corresponds to a creation time associated with the executable on the decentralized network, the creation time corresponding to a time that the executable is created on the decentralized network; and
iterating, based on the executable address, over the token allowance events associated with the executable from the first data structure until a latest data structure of the cryptographically-linked data structures.

15. The method of claim 13, wherein the extracting, from the source addresses associated with the network tokens of the decentralized network and the allowance amounts associated with the network tokens comprises executing a balance of function call for each of the source addresses.

16. The method of claim 13, further comprising:
obtaining a second executable address associated with a second executable on a second decentralized network;
performing, based on the second executable address, a second query for token allowance events associated with the second executable, the token allowance events associated with the second executable being stored in cryptographically-linked data structures of the second decentralized network;
extracting, from the token allowance events associated with the second executable, second source addresses associated with second network tokens of the second decentralized network and second allowance amounts associated with the second network tokens, wherein each of the second network tokens corresponds to a resource related to the second decentralized network;
generating, based on the extractions, a second routing data structure indicating exchange eligibility of resource sources;
obtaining the resource exchange request for exchanging one or more resources of the second decentralized network;
in response to obtaining the resource exchange request, verifying acceptance of the resource exchange request based on the second routing data structure; and
in response to verifying the acceptance of the resource exchange request based on the second routing data structure, initiating a second update to the second decentralized network.

17. The method of claim 13, wherein the executable comprises first data represented in a first format, the method further comprising:
- transforming the executable into a network-specific data structure having a network-specific format associated with the decentralized network by transforming the first data represented in the first format into a first data structure having a second format differing from the first format, the first data structure representing values associated with one or more parameters in the second format.

18. The method of claim 17, further comprising:
obtaining a public key associated with a data source;
generating a reference value based on a digital signature and the public key associated with the data source; and
- performing verification of the network-specific data structure by:
- generating a hash value of the network-specific data structure; and
- determining that the hash value and the reference value match, wherein the hash value and the reference value are provided to the executable based on the verification of the network-specific data structure indicating that the hash value and the reference value match.

19. The method of claim 18, further comprising:
causing the hash value and the reference value to be extracted from the network-specific data structure.

20. The method of claim 13, wherein the routing data structure indicating exchange eligibility of resource sources comprises an approval event form indicating a positive integer of a 256 bit size.

\* \* \* \* \*